United States Patent [19]
Dubois et al.

[11] Patent Number: 5,826,820
[45] Date of Patent: Oct. 27, 1998

[54] HOMING DEVICE SYSTEM FOR MISSILE

[75] Inventors: Pascal Dubois, Chatenay Malabry; Jérôme Maffert, Versailles, both of France

[73] Assignee: Aerospatiale Societe Nationale Industrielle, Paris, France

[21] Appl. No.: 67,660

[22] Filed: May 15, 1987

[51] Int. Cl.[6] .............................. F41G 7/00; F42B 10/00; G01J 5/02; G02B 26/08

[52] U.S. Cl. .................. 244/3.16; 250/342; 250/347; 250/334; 359/213; 359/214

[58] Field of Search ................................ 244/3.16, 3.17; 250/203 R, 332, 334, 338.1, 342, 347; 358/113, 126, 206, 208; 350/6.5, 6.6, 6.8; 359/214, 213

[56] References Cited

U.S. PATENT DOCUMENTS

| | | | |
|---|---|---|---|
| 3,603,686 | 9/1971 | Paine et al. | 250/203 R X |
| 3,622,788 | 11/1971 | Briggs | 250/347 |
| 4,123,134 | 10/1978 | Meyers | 350/6.7 |
| 4,189,747 | 2/1980 | Funari | 250/342 X |
| 4,262,199 | 4/1981 | Bridges et al. | 250/342 X |
| 4,277,039 | 7/1981 | Blanning et al. | 244/3.16 |
| 4,486,662 | 12/1984 | Abel | 250/342 X |
| 4,709,876 | 12/1987 | Pinson | 244/3.16 |

*Primary Examiner*—Stephen C. Buczinski
*Attorney, Agent, or Firm*—Antonelli, Terry, Stout & Kraus, LLP

[57] ABSTRACT

A guidance system for guiding a missile to a target including an array of photosensitive elements arranged orthogonally to the axis of the missile, a scanning arrangement for enabling scanning of the array of photosensitive elements by means of an optical system, and a target detecting arrangement for controlling the field and the pace of scanning executed by the scanning arrangement so that the field of scanning is smaller and the pace of scanning is greater after detecting a target than before target detection.

6 Claims, 4 Drawing Sheets

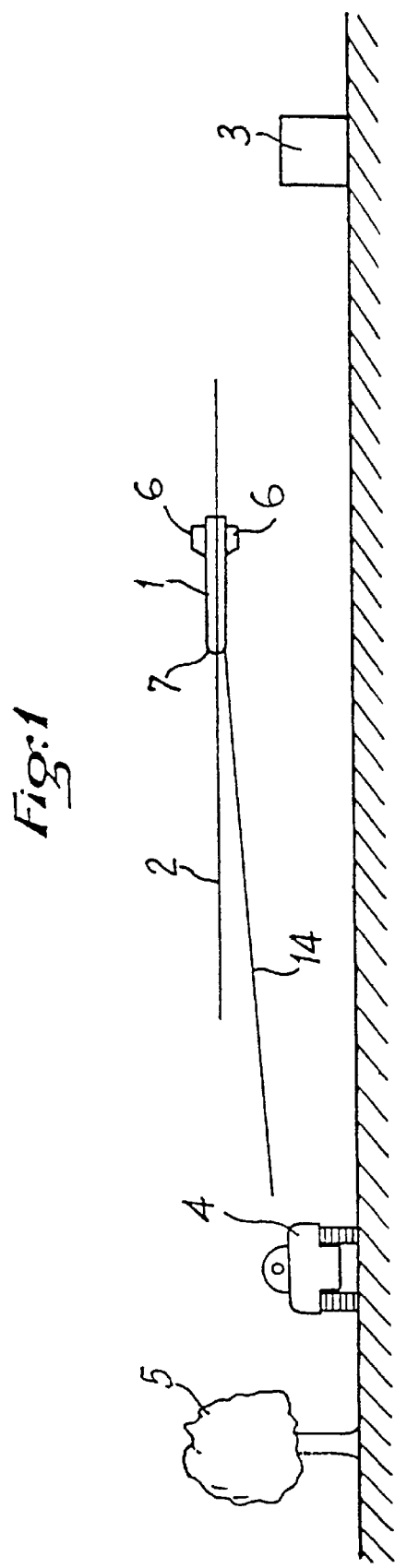

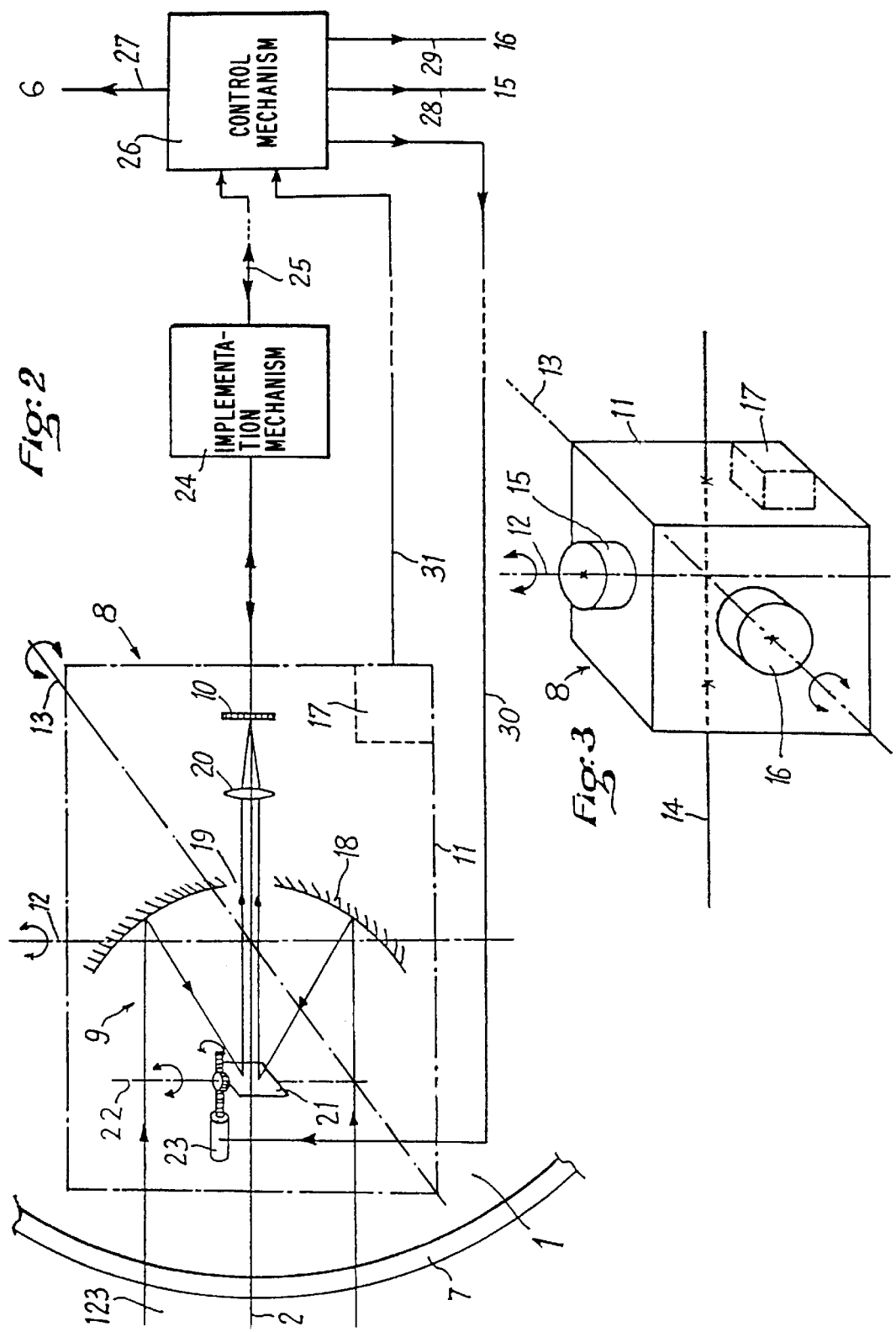

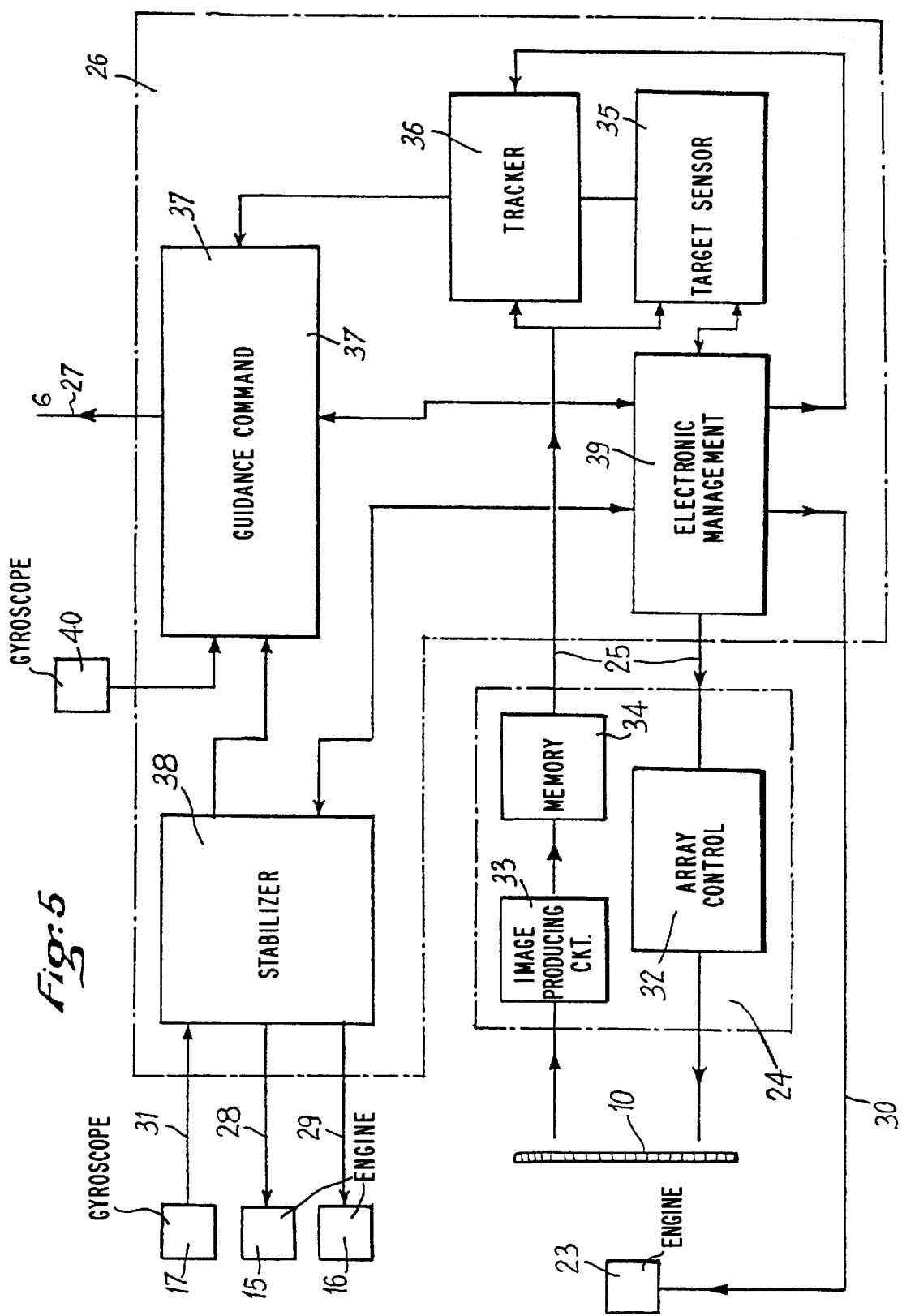

HOMING DEVICE SYSTEM FOR MISSILE

This invention concerns a system for guiding a missile that moves without rotating on its axis. Although not exclusively, it is especially adapted for the homing device of missiles that are anti-tank or analogous.

Some of those missiles, in order to guide them to a target, include a guidance system, of the homing type, comprised of an optical system that is prone to produce images of the landscape in which the missile moves, a unit of photosensitive elements which accommodates said optical images and transforms them into electrical images, as well as a target detecting device, for instance of the type of form or temperature recognition. The optical system and the unit of photosensitive elements are mounted on the missile by way of a gyroscopic stabilization mechanism, in order for the images obtained to be of good quality so that the probable shifts of a target in relation to static elements in the landscape can be followed. The missile is endowed with means for controlling its trajectory, such as aerodynamic control surfaces or nozzles supplied by fluid jets, that are controlled to direct the missile towards the target, in relation to the position of the latter set on the images. Such guidance systems display the inconvenience that the width of the observed field and the pace of renewal of image information are static during the entire length of the missile flight. It ensues that it is difficult to execute, during the same mission, two distinct functions such as watch (overflight of a territory seeking a target) and tracking (specific guidance on a target after detecting it).

The purpose of this invention is to remedy this inconvenience. To this end according to this invention, the system for guiding a missile to a target which moves without turning around its axis, which includes an optical system that can produce images of the landscape in which said missile moves, a unit of photosensitive elements that picks up said optical images to transform them into electrical images, as well as target detecting mechanism, is remarkable:

in that the unit of photosensitive elements is comprised by at least one linear array of such photosensitive elements, arranged orthogonally to the axis of the missile;

in that sweeping means are planned that make it possible to have the array be scanned by the beam which comes from said optical system, the scanning direction being orthogonal to the array; and in that the target detecting mechanism controls the field and the scanning pace executed by the scanning means, so that the field is smaller and that pace is greater, after detecting a target than before.

Thus, before detecting a target, during the search of the latter, the guidance system makes it possible to explore a wide field at a pace which might be relatively weak. On the contrary, as of the detection of a target in such a wide field, during the tracking phase, information at a very high pace can be obtained, which comes only from the restricted field that surrounds the target. Guidance for the missile is therefore optimized, since it can search for a target in a wide field, while benefiting from high scanning pace after detecting that target.

Even if other targets can be envisioned, it is advantageous that the array of photosensitive elements is vertical and that the scanning direction is horizontal.

Furthermore, in order to obtain the two field scans with different pace, a single but adjustable scanning mechanism is usable. However, it has been proven preferable to set forth two distinct scanning apparatuses.

Advantageously, when the optical system and the unit of photosensitive elements, in a known fashion, are borne by a platform that is gyroscopically stabilized in relation to the rest of the missile, scanning prior to detection of the target is executed with one of the stabilizing engines that makes the platform oscillate around one of its axis which is parallel to the array. When it is vertical, that scanning is therefore performed around the winding stabilizing axis.

On the other hand, fast scanning after detection is achieved with an optical element with low inertia, such as an oscillating mirror, incorporated to the optical system.

It can be advantageous to use several arrays which are arranged parallel side by side and sensitive to different wavelengths. Thus we can obtain multispectral images that can favor target detection can be obtained.

The figures in the attached drawing will convey a good understanding how the invention can be executed. On those figures, identical references designate similar elements.

FIG. 1 illustrates an application of this invention to an anti-tank missile.

FIG. 2 is the simplified block diagram of the guidance system in conformance with this invention.

FIG. 3 is a schematic perspective view of the optical head of the system in FIG. 2.

FIG. 5 depicts the block diagram of an execution mode of the system according to the invention.

Figure 4:
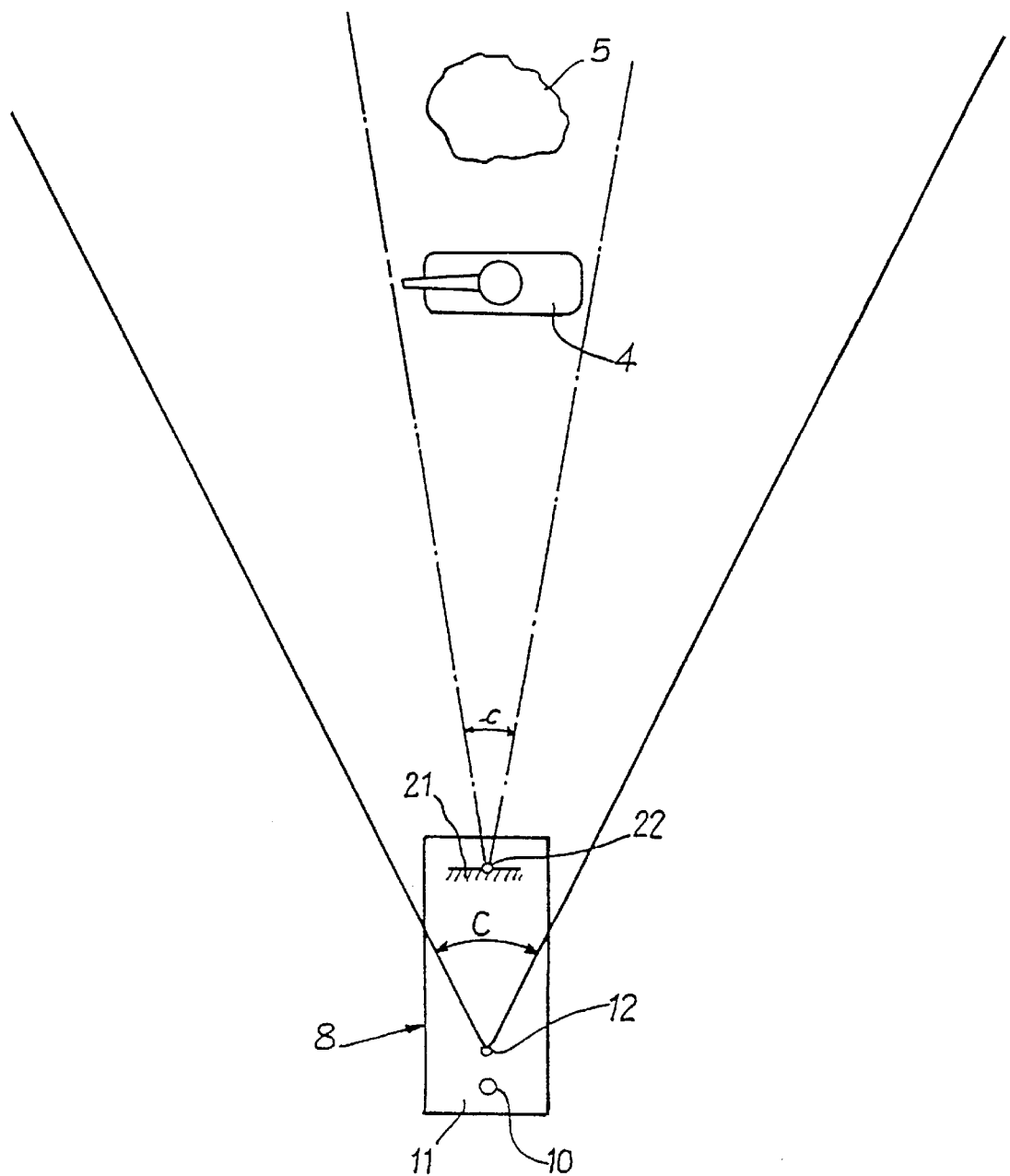
FIG. 4 illustrates, in a schematic view from above of FIG. 1, the operation of the guidance system in FIG. 2.

In FIG. 1, a missile 1 with a lengthwise axis 2 according to a flight trajectory, after having been launched from a firing station 3, in the direction that at least approximates a target 4 is depicted. The target 4 moves in a landscape, where only a tree 5 has been depicted and the trajectory of the missile is controlled by controllable surfaces 6.

In the front part of the missile 1 (see FIG. 2), behind a radome 7, an optical head 8 is arranged which includes an optical system 9 and an array 10 of photosensitive elements, of the load transfer type, comprised of a large number of aligned photosensitive elements. In the execution example of FIG. 2, the array 10 is assumed to be vertically arranged. The optical system 9 and the array 10 of the optical head 8 are enclosed inside a joint envelope 11 connected to the missile 1 so as to be able to turn both around a vertical axis 12 and a horizontal axis 13, which is orthogonal to the axis of the missile 1. Thus, the optical axis 14 of the optical head 8 can be directed in relation to the vertical winding axis 12 and to the horizontal pitch axis 13.

As FIG. 3 shows, the rotations of the envelope 11 (and therefore of the optical head 8) around axes 12 and 13 are respectively obtained by way of a winding engine 15 and of a pitch engine 16. The articulations of the envelope 11 on the structure of the missile 1 can be of any appropriate kind and they have not been represented.

Inside the envelope 11 a double winding and pitch gyrometer or gyroscope 17 is arranged, which can control engines 15 and 16, as it will be stated later.

The optical system 9 (see FIG. 2) includes a primary concave mirror 18 of which the axis is confused with the optical axis 14 (in FIG. 2, the optical axis 14 is presumably confused with the axis 2 of the missile 1). The central part of the primary mirror 18 is pierced with a passageway 19 and, on the side of the convexity of said mirror, a lens 20 is arranged, which can focus on the array 10. Furthermore, in the convexity of the primary mirror a secondary mirror 21 is arranged which can oscillate around a vertical axis 22 (therefore parallel to the array 10 and to the axis 12), under the action of an engine 23, for instance by way of a worm pinion assembly.

The elements of the optical system 9 are arranged in such a way that a parallel light beam 123, which comes for instance from the target 4, reaches the primary mirror 18, which reflects it in the direction of the secondary mirror 21. The latter refers it to the lens 20 through the hole 19. When the engine 23 makes the secondary mirror 21 oscillate around the vertical axis 22, the beam that comes out of the lens 20 scans the array 10.

Of course, the radome 7 is transparent for the radiation(s) that the array 10 is sensitive to.

Usually, the array 10 is controlled by an implementation mechanism 24. The latter is connected, by a link 25 to an electronic control device 26 that can be either mounted on board the missile 1, or positioned at the firing station 3. The control mechanism 26 can act, on the one hand on the control surfaces 6 of the missile (link 27), on the other hand on engines 15, 16 and 23 (respective links 28, 29 and 30). Furthermore, this control mechanism 26 picks up information from the gyroscope 17 by way of a link 31. In the event that the mechanism 26 is not loaded on board the missile, links 25, 30 and 31 can be of any appropriate known type (telegraphic, radio, luminous, etc . . . ).

The control mechanism 26 can not only stabilize, but also direct the optical axis 14 in relation to the axis 2 of the missile 1, by acting on the engines 15 and 16.

The operation of the mechanism according to the invention is illustrated below, by also referring to FIG. 4.

When the missile is in watch position, in other words when, in flight, it seeks a target, the mechanism 26 blocks the mirror 21 in its position that is orthogonal to the optical axis 14 end commands the engine 23 to stop. On the other hand, it commands the winding engine 15 to start, so that the optical head 8 oscillates around the winding axis 12. This oscillation around the axis 12 is fairly slow and encompasses a wide optical field C. The result is a corresponding scan of the array 10 and the mechanism 24 supplies images which are very wide horizontally, but that are renewed fairly slowly.

During this vast and slow exploration, after the mechanism 26 has sensed a target 4, the scan is altered. The mechanism 26 then commands the engine 15 to stop, and activates the engine 23, for the optical head 8 being static or moving very slightly so as to sustain the optical axis 14 in the direction of the target as the missile 1 advances, the mirror 21 oscillates quickly around its vertical axis 22, at low amplitude.

The array 10 and the mechanism 24 therefore produce images that are not very wide horizontally, which correspond to the reduced field c. Missile 1 guidance towards the target 4 can therefore be very accurate.

In FIG. 5, the block diagram of the electronic circuit of the mechanism in FIG. 2 is depicted.

The implementation mechanism 24 of the array 10 includes an electronic circuit 32 which is designed to control the array, an image-producing circuit 33 that comes from the scanned array 10 (either through the secondary mirror 21, or by as a result of oscillation of the optical head 8 around the winding axis 12) and a memory 34 for temporary storage of said images. The latter are referred to a target sensor 35 which is part of the control mechanism 26, that includes a mechanism 36 for the automatic tracking of a target, a guidance command design mechanism 37 for the missile 1 by acting on the control surfaces 6, a stabilizing mechanism 38 for the optical head 8 and an electronic management mechanism 39, for instance of the microprocessor family. We can also set forth a roll gyroscope 40 which supplies its information to the mechanism 37, that also picks up information from mechanisms 36 and 38 and commands from the mechanism 39.

In watch position, guidance for the missile 1 is therefore ensured by the mechanism 37, under the control of the mechanism 39, and in view of the information from the gyroscopes 17 and 40. Moreover, the infrequent wide field images are referred to the target sensor 35 which, as long as it does not recognize a target, it refers corresponding to the mechanism 39. The latter keeps the engine 23 at full stop, but asks the mechanism 38 to activate in an alternate rotation engine 15 of the optical head 8.

When the sensor 35 recognizes a target 4, it warns the mechanism 39, which stops the scanning oscillation around the axis 12 and controls the engine 23 with fast low amplitude oscillations; moreover, the sensor 35 triggers the automatic tracking mechanism 36, which, under the control of the mechanism 39, imposes its commands onto the mechanism guidance command design mechanism 37. The automatic tracking mechanism 36 also accommodates images from the mechanism 24, so that it can ensure guidance for the missile 1, until it makes contact with the target 4.

We claim:

1. A system for guiding a missile to a target, the misssile moving without rotation about an axis thereof, the system comprising optical means for producing optical images of a landscape in which the missile moves, conversion means for converting the optical images into electrical signals, the conversion means including at least one linear array of photosensitive elements arranged orthogonally to the axis of the missile, scanning means including first and second scanner means for scanning the at least one linear array of photosensitive elements in a scanning direction orthogonal to the at least one linear array, the optical means and the conversion means being gyroscopically stabilized with respect to other portions of the missile, and target detecting means responsive to the electric signals from the conversion means for detecting the target and for controlling a field of scanning and a pace of scanning executed by the scanning means, the target detection means being arranged for enabling scanning by the first scanner means for oscillating at least the optical means about a first axis extending parallel to the at least one array before target detection so as to effect scanning over a large scan field and at a small pace of scanning, and after target detection, the target detection means enabling scanning by the second scanner means for oscillating at least a part of the optical means about a second axis extending parallel to the at least one array so as to effect scanning over a smaller scanning field and at a greater scanning pace than before target detection, and thereby enabling guidance of the missile to the target.

2. A system according to claim 1, wherein the at least one array extends in a vertical direction, the scanning means effecting scanning of the at least one array in a horizontal scanning direction.

3. A system according to claim 2, wherein the first scanner means effects oscillating movement about the first axis which is a stabilizing axis.

4. A system according to claim 1, wherein the second scanner means enables scanning with an optical element which is a part of the optical means about the second axis which extends in parallel to the first axis.

5. A system acccording to claim 1, wherein the optical element is a mirror and the second scanner means effects oscillating movement of only the mirror about the second axis.

6. A system according to claim 1, wherein the conversion means includes a plurality of linear arrays of photosensitive elements arranged parallel and side by side, respective ones of the plurality of linear arrays being sensitive to different wavelengths.

* * * * *